United States Patent
Sabi (10) Patent No.: US 6,844,044 B2
(45) Date of Patent: Jan. 18, 2005

(54) OPTICAL RECORDING MEDIUM (75) Inventor: Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/344,500

(22) PCT Filed: Jun. 11, 2002

(86) PCT No.: PCT/JP02/05802

§ 371 (c)(1),
(2), (4) Date: Jun. 12, 2003

(87) PCT Pub. No.: WO02/101735

PCT Pub. Date: Dec. 19, 2002

(65) Prior Publication Data

US 2004/0008610 A1 Jan. 15, 2004

(51) Int. Cl.[7] .................................... B32B 3/02
(52) U.S. Cl. .................. 428/64.1; 428/64.4; 428/64.8; 430/270.14
(58) Field of Search .................. 428/64.1, 64.4, 428/64.8; 430/270.14, 495, 945.1

(56) References Cited

U.S. PATENT DOCUMENTS

| 4,931,336 | A | * | 6/1990 | Haneda ...................... 428/64.4 |
| 6,232,036 | B1 | * | 5/2001 | Suzuki et al. .......... 430/270.16 |
| 6,287,660 | B1 | * | 9/2001 | Hosaka et al. ............. 428/64.1 |
| 6,341,122 | B1 | * | 1/2002 | Usami et al. ............. 369/275.4 |
| 6,379,768 | B1 | | 4/2002 | Saito |
| 6,452,899 | B1 | * | 9/2002 | Fujii et al. ................ 369/275.4 |
| 6,490,240 | B1 | * | 12/2002 | Usami ...................... 369/275.4 |
| 6,673,411 | B2 | * | 1/2004 | Koide et al. ................ 428/64.1 |

FOREIGN PATENT DOCUMENTS

| AU | 20012258 | 12/2000 |
| EP | 1083 555 A1 | 3/2001 |
| JP | 02-185737 | 7/1990 |
| JP | 02-187937 | 7/1990 |
| JP | 03-040222 | 2/1991 |
| JP | 07-156547 | 6/1995 |
| JP | 2000-228028 | 8/2000 |
| JP | 2001-039032 | 2/2001 |
| JP | 2001-146074 | 5/2001 |
| JP | 2001-287465 | 10/2001 |
| JP | 2002-086923 | 3/2002 |
| WO | WO 01/477719 A1 | 5/2001 |

* cited by examiner

Primary Examiner—Elizabeth Mulvaney
(74) Attorney, Agent, or Firm—Sonnenschein, Nath & Rosenthal LLP (57) ABSTRACT A phase modulation type optical recording medium has at least one layer of recording film 4 and at least one layer of metal film 3 on a substrate 1 having recessed portions formed therein, wherein one or more layers constituting the recording film include organic material that decomposes upon absorption of laser light to change its refractive index, and width of the recessed portions 2 is set to 0.10 μm~0.21 μm, thereby providing an optical recording medium of write once type with high recording density capable of high reproduction output.

3 Claims, 11 Drawing Sheets

L-edge Before Recording

FIG. 4B

L-edge After Recording

FIG. 5A

S-edge Before Recording

FIG. 5B

S-edge After Recording

OPTICAL RECORDING MEDIUM

BACKGROUND OF THE INVENTION

The present invention relates to an optical recording medium, specifically to a phase modulation type optical recording medium having excellent reproduction output characteristics, in which reproduction of recorded portions is performed by irradiating light in the range of 380 nm~450 nm in wavelength $\lambda$ and organic pigment material is used as a recording film.

Functional organic pigment material is heretofore widely used as recording material for write once type optical discs and are manufactured in large quantity at a low cost, particularly as write once type compact discs (CD-R).

Also, in optical systems in DVD (Digital Versatile Disc), a write once type has been standardized as a write once type DVD-R and has been on sale.

Moreover, as an optical disc of currently so-called a next-generation optical recording medium in which higher recording capacity, i.e., higher recording density is intended, there has been considered standardization of irradiating blue-violet light of shorter wavelength onto a recording surface through an object lens of 0.85 in numerical aperture N.A. from the side of a light transmission protective film formed on the recording surface.

In an optical recording medium in which the above-mentioned higher N.A. and shorter wavelength of reproduction light are obtained and a reproduction light is irradiated onto the recording surface from the side of a light transmissive protection film (hereinafter this optical recording medium is referred to as DVR for convenience), there are also increasing needs for a write once type optical recording medium (DVR) in which so-called archive recording is performed, i.e., recording is performed only once and the record is stably held over many years without being erased.

Although in the above-described optical recording medium (DVR) under consideration of such standardization the recording film based on phase change material is used, as the recording film it is preferable to use organic pigment material as in CD-R considering a simple method of manufacturing and cost reduction when the optical recording medium has a write once type construction.

However, there is a problem when knowledge of the conventional write once type CD-R and DVD-R is applied to the write once type optical recording medium (DVR) employing the above-mentioned short wavelength and high N.A.

Specifically, in an optical recording medium using a short wavelength of 380 nm~450 nm, e.g., blue-violet light source of 405 nm±5 nm for high recording density, i.e., high resolution, if the recording film is comprised of organic pigment material, the characteristics of such organic pigment material constituting the recording film differ from those in CD-R and DVD-R and optical characteristics and optical conditions may be different, so that there may be problems in applying knowledge used in general CD-R and DVD-R.

For example, it is impossible to obtain excellent reproduction characteristics by such measures as modifying depth of recessed portions, for example, tracking grooves formed in the substrate of an optical recording medium in response to differences in wavelengths of irradiated lights.

Further, the track pitch in the above mentioned optical recording medium (DVR) is significantly smaller as compared to that in conventional optical recording media. The track pitch is, for example, 0.34 $\mu$m as compared to 1.6 $\mu$m in CD, for example. In this case, the slope of side walls in tracking groves formed in the disc substrate will be the matter.

In general, fine concavity and convexity such as grooves or pits in CDs and the like are formed while manufacturing the disc substrate by injection molding in which a stamper having a fine pattern of concavity and convexity corresponding to the grooves is used, by a 2P method (photopolymerization method) or by other methods.

The stamper is manufactured by forming the master, that is, mastering using photoresist, and blue light or ultra-violet light is generally used for pattern exposure onto such photoresist in the mastering. However, when such fine track pitches as those provided in the above mentioned DVR are narrow and small, the pattern exposure by the above mentioned light results in gentle slope of side walls of the grooves.

Accordingly, although there have been attempted such methods as performing pattern exposure onto the photoresist by electron beam lithography, by reducing a spot size with disposing a focusing lens adjacent to the exposure surface in an optical system, i.e., taking so-called near field construction or the like in order to sharpen the side walls of the grooves or to improve those conditions, studies on optimization of the side walls of the grooves are insufficient, and sufficient reproduced output has not yet been achieved.

SUMMARY OF THE INVENTION

According to the present invention, in an optical recording medium of the above mentioned write once type optical recording medium currently so-called next generation optical recording medium in which wavelength of the irradiated reproduction light is made shorter and the reproduction light is irradiated onto a recording surface from the side of a light transmissive protection film, there is provided such optical recording medium as capable of obtaining high reproduction output and having excellent reproduction characteristics.

Specifically, the optical recording medium according to the present invention is a phase modulation type optical recording medium in which reproduction of recorded portions is performed by irradiating light in the range of 380 nm~450 nm in wavelength $\lambda$ through an optical system having numerical aperture N.A. of 0.85±0.05, comprising at least one layer of recording film and at least one layer of metal film on a substrate having recessed portions formed therein. At least one layer of the recording film includes organic material that decomposes upon absorption of laser light to change its refractive index.

Moreover, particularly in the above described construction, width of the recessed portions on the substrate is set to not less than 0.10 $\mu$m nor more than 0.21 $\mu$m.

Also, in this construction having metal film formed on the recessed portions of the substrate, width of the recessed portions on the surface of the metal film is set to not less than 0.10 $\mu$m nor more than 0.15 $\mu$m.

Further, the optical recording medium according to the present invention is a phase modulation type optical recording medium in which reproduction of recorded portions is performed by irradiating light in the range of 380 nm~450 nm in wavelength $\lambda$, comprising at least one layer of recording film and at least one layer of metal film formed on a substrate having recessed portions therein, in which at least one layer of the metal film includes organic material that decomposes upon absorption of laser light to change its refractive index. Further, depth of the recessed portions in the substrate is set to not less than 40 nm nor more than 65 nm and the organic material in the recording film is the material having refractive index set to 1.4 or lower before recording.

Further, the optical recording medium according to the present invention is a phase modulation type optical recording medium in which reproduction of recorded portions is performed by irradiating light in the range of 380 nm~450 nm in wavelength $\lambda$, comprising at least one layer of recording film and at least one layer of metal film formed on a substrate having recessed portions therein, in which at least one layer of the metal film includes organic material that decomposes upon absorption of laser light to change its refractive index. Further, depth of the recessed portions on the substrate is set to not less than 75 nm nor more than 115 nm and the organic material used as the recording film is the material having refractive index set to 1.6 or higher before recording.

Further, in each of the above mentioned optical recording mediums according to present invention, slope tan $\theta$ of the side walls of the recessed portions in the substrate is set to 2 or larger (where, $\theta$ is the angle defined by the side wall and bottom surface of the recessed portions).

Each of the above-described optical recording mediums according to the present invention is the optical recording medium in which reproduction is performed by the phase modulation method and optimum signal output is obtained as hereinafter described.

DETAILED DESCRIPTION OF THE PRESENTLY PREFERRED EMBODIMENTS

An embodiment of a write once type optical recording medium according to the present invention is the write once type optical disc in which reproduction, or reproduction and recording are performed by an object lens whose numerical aperture N.A. is 0.85±0.05 using a blue-violet laser in the region of 380 nm~450 nm in wavelength $\lambda$ (hereinafter the N.A. and $\lambda$ are referred to as DVR parameters).

However, it is to be noted that the present invention is not limited to optical discs but is applicable to other forms such as, e.g., cards and the like depending on modes of use.

The optical recording medium according to the present invention, for example, recording film of an optical disc comprises at least one layer formed of organic material, specifically organic pigment material whose refractive index is changed when recording is performed by irradiating light having, for example, the above mentioned wavelength.

Figure 1:
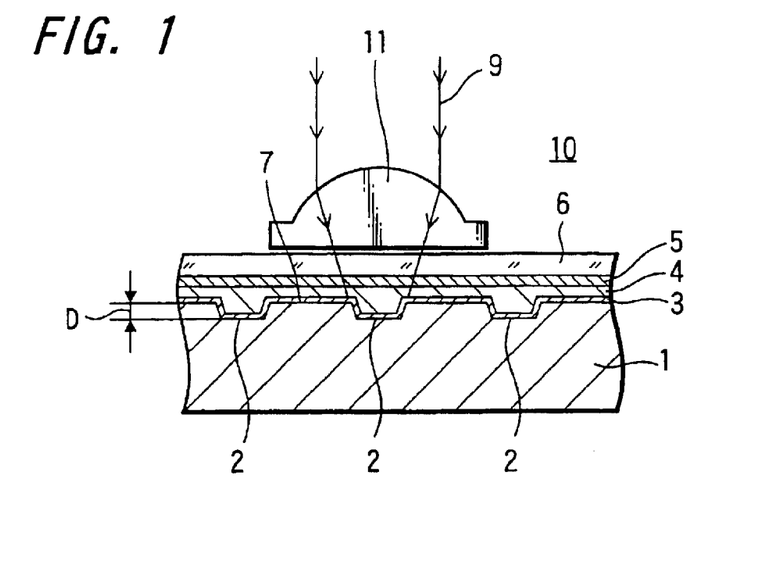
FIG. 1 is a cross sectional view showing the basic structure of an optical recording medium according to the present invention.
Figure 2:
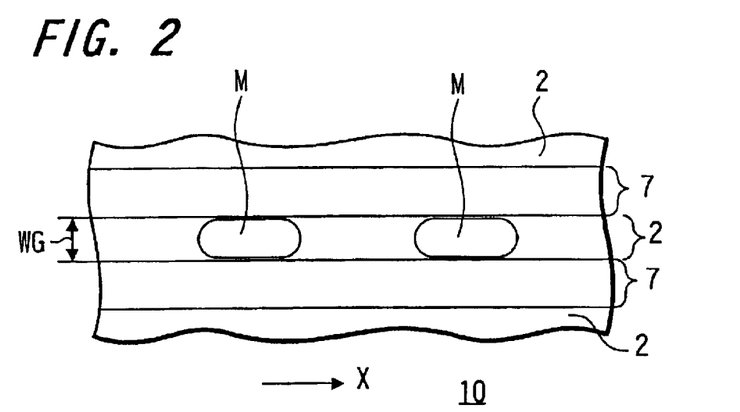
FIG. 2 is a schematic plan view of the optical recording medium according to the present invention.

FIG. 1 is a schematic sectional view of a basic structure of an optical recording medium 10, for example, an optical disc according to the present invention, while FIG. 2 is a plan view to schematically show relevant parts in which recording marks M are formed.

The optical recording medium 10 comprises: a metal film 3, a recording film 4 and a dielectric film 5 formed on a substrate 1 having recessed portions 2 which is, for example, continuous or intermittent grooves or the like for tracking provided on at least one main surface, and on these films there is further coated by spin coating a light transmissive protection film 6 formed of a light transmissive resin having a thickness of, e.g., 0.1 mm.

An organic pigment film of the recording film 4 is formed by, e.g., spin coating.

As shown in spectrum charts of optical constants (refractive index n and absorption coefficient k) before recording and after recording in FIG. 4A and FIG. 4B, pigment used for the organic pigment film has a characteristic of showing higher refractive index before recording than after recording (hereinafter referred to as an L-edge characteristic) or as shown in spectrum charts of optical constants before recording and after recording in FIG. 5A and FIG. 5B, pigment used for the organic pigment film has a characteristic of showing a lower refraction index before recording than after recording (hereinafter referred to as an S-edge characteristic).

Figure 4A:
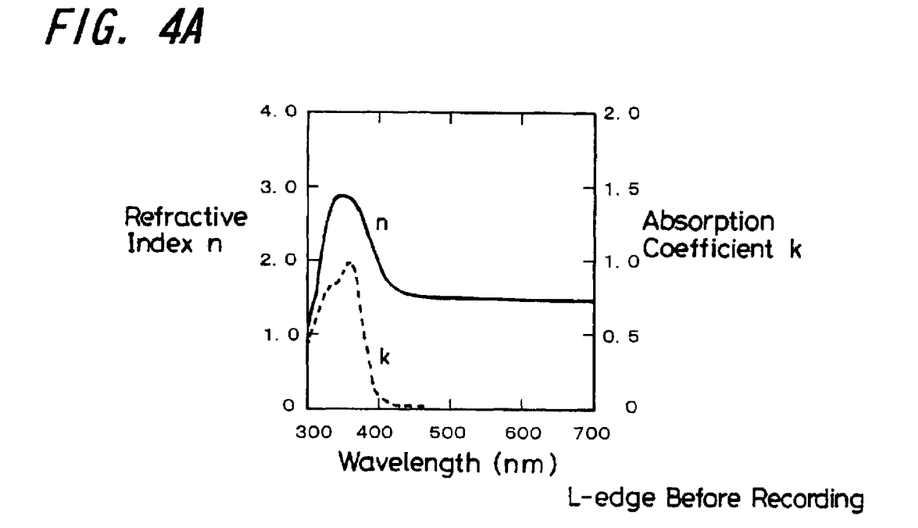
FIGS. 4A and 4B are characteristic curves provided to describe the present invention, which show changes in optical characteristics before and after recording.
Figure 4B:
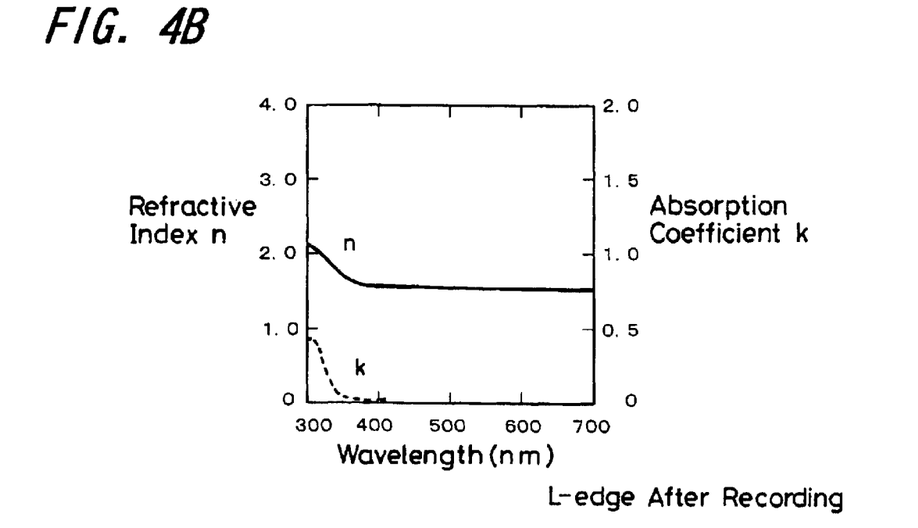
Figure 5A:
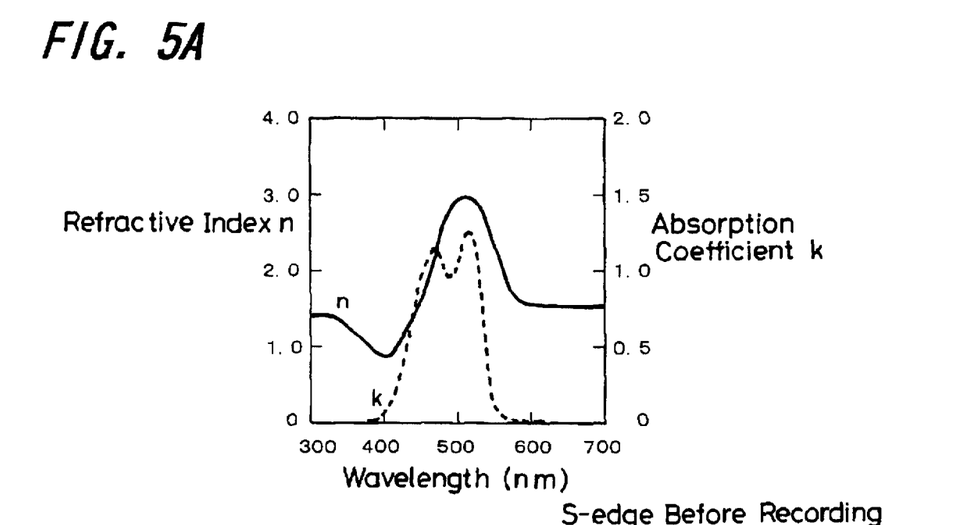
FIGS. 5A and 5B are characteristic curves provided to describe the present invention, which show changes in optical characteristics before and after recording.
Figure 5B:
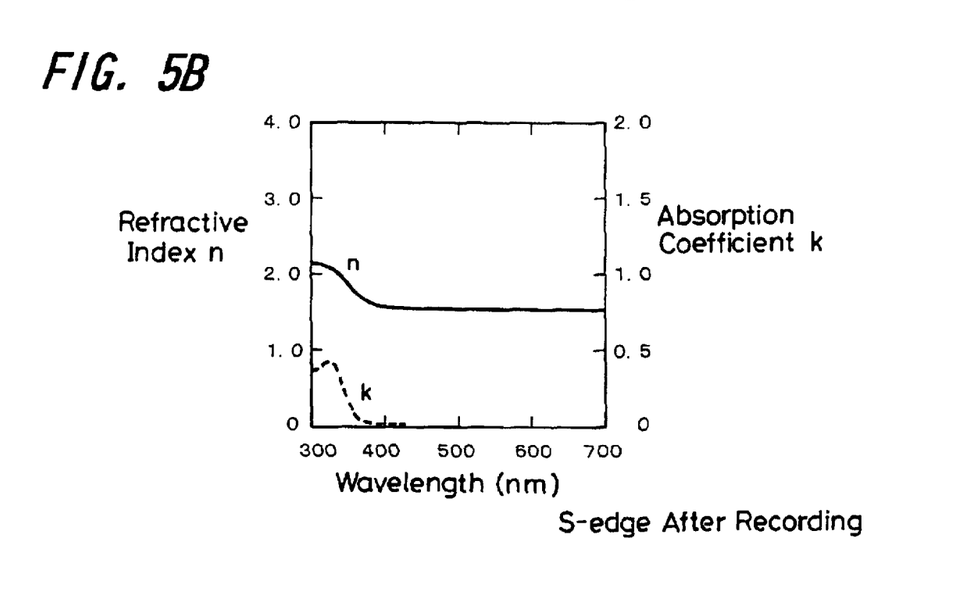

When there is no absorption spectrum at about 400 nm in wavelength, as shown in spectrum charts of optical constants in FIG. 4B or FIG. 5B, refractive index n of the organic pigment film is 1.5 and absorption coefficient k thereof is close to 0. Then, in order to obtain a reproduction signal, the refractive index n before recording, that is, before thermal decomposition of the organic pigment material is required to change after recording, or after thermal decomposition, and it is preferable that the difference Δn between refractive indexes before recording and after recording is 0.1 or higher.

For example, the organic pigment film is formed of organic pigment material having the L-edge characteristic in which, as shown in FIG. 4A, refractive index that is higher than 1.5, specifically 1.6 or higher before recording decreases, as shown in FIG. 4B, close to 1.5 after thermal decomposition, that is, after recording.

Alternatively, the organic pigment film is formed of organic pigment material having the S-edge characteristic in which, as shown in FIG. 5A, refractive index that is lower than 1.5, specifically 1.4 or lower before recording increases to higher values after recording as shown in FIG. 5B.

In the optical recording medium 10 according to the present invention, the recessed portions 2, i.e., the grooves 2 are formed as recessed toward the substrate 1 and areas between the grooves are referred to as land portions 7.

In the optical recording medium according to the present invention, the organic pigment film of the recording film 4 is formed to be thicker inside the recessed portions 2, e.g., inside the grooves and to be thinner on the land portions 7 by selecting the amount of coating, the number of revolution, temperature and humidity of the spin coating.

Then, areas within the recessed portions 2, i.e., inside the grooves are defined as recording portions. That is to say, recording marks M are formed within the recessed portions 2.

As described above, the recording portions are provided within the grooves, whereby cross write between the recording tracks can be reduced.

In the organic pigment film, recording is performed by recording the change in length of the light path due to the change in optical constants (n, k) as a signal, and degree of modulation becomes low if the film thickness is thin, whereby degree of modulation becomes low at the land portions having a thinner film and virtually makes no contribution to the detected signal when the inside of the recessed portions 2 is employed as recording portions.

In the embodiment of the optical recording medium 10 according to the present invention, an optical system according to the above mentioned DVR parameter is applied and a laser light 9 is converged and irradiated from the side of the light transmissive protection film 6 through an object lens 11.

The recording film 4 comprises at least one layer of component film, at least one of which is formed of an organic material film, specifically an organic pigment film having the above mentioned L-edge characteristic or S-edge characteristic in which refractive index changes upon decomposition by absorbing laser light, and the recording marks M are written by the change of the refractive index within the recessed portions 2, i.e., within the grooves.

When the substrate 1 having the recessed portions 2 is provided, a stamper having protruding portions corresponding to the pattern of the recessed portions 2, i.e., having an inverted pattern to that of the recessed portions 2 is prepared, and the substrate 1 is formed of polycarbonate (PC) resin or the like by injection molding that uses a mold in which the stamper is disposed in cavity.

Alternatively, the substrate 1 having the recessed portions 2 can be formed by the 2P method.

Specifically, in this case, a ultraviolet curing resin is coated on a flat surface of the substrate by spin coating or the like, and the recessed portions 2 are formed by pressing the above mentioned stamper onto the resin layer, which is then cured by irradiating ultraviolet rays to form the substrate 1 having a required pattern of the recessed portions 2.

In the above mentioned construction, average width WG of the recessed portions 2 (=(width $W_1$ at the bottom 30 width $W_2$ at the opening $W_2$)/2 this will be applied in the following) is set to 0.10 μm~0.21 μm (see FIG. 3).

Alternatively, the width on the surface of a metal film formed on the recessed portions 2 of the substrate 1 is set to 0.10 μm~0.15 μm.

Depth D of the recessed portions 2 is set to 40 nm~65 nm in the case where the organic pigment film constituting the recording film has the S-edge characteristic of 1.4 or lower refractive index before recording.

Alternatively, depth D of the recessed portions 2 is set to 75 nm~115 nm in the case where the organic pigment film constituting the recording film has the L-edge characteristic of 1.6 or higher refractive index before recording.

Figure 3:
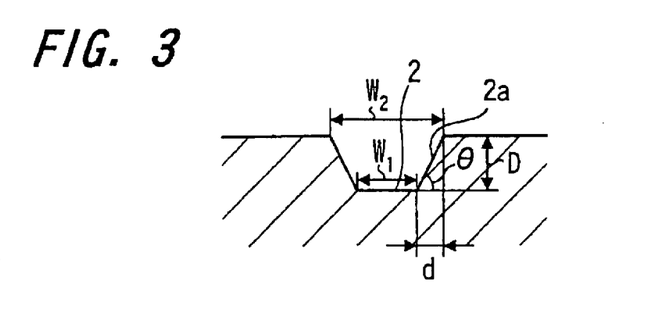
FIG. 3 is an explanatory view describing the slope of side walls of a recess portion in the optical recording medium according to the present invention.

Moreover, as shown in FIG. 3, a slope of the sidewalls 2a of the recessed portions 2 is set to satisfy tan θ≧2, where θ is the angle defined by the side wall 2a and the bottom surface of the recessed portions 2.

Furthermore, it is preferable that width WG of the recessed portions 2, i.e., width of the grooves is narrow in order to reduce cross write. Cross write can be, thus, reduced practically under the constant track pitch by making the portion of the beam spot which has a small amount of distributed light irradiating onto the adjacent grooves smaller when width of the grooves becomes narrow.

It is noted that the above-described reduction in cross write is a characteristic obtained when the phase modulation type organic pigment film is employed as the recording film and the characteristic differs from a that of the reflectance modulation type optical recording medium in which phase change material is employed as the recording film and the change in reflectance of the recorded portion is directly read out.

Next, embodiments of the optical recording medium according to the present invention will be described.

[First Embodiment]

In this embodiment, the recessed portions 2 are grooves provided as tracking guide grooves having the dimensions of 100 nm in depth, 0.12 μm in width, 0.6 μm in space between the grooves, and tan θ=2 in slope of the side walls of the grooves as illustrated in FIG. 3.

Also, in this embodiment, a phase modulation type optical disc is manufactured using a polycarbonate (PC) substrate 1 in which the recessed portions 2, i.e., the grooves are formed in one main surface of the substrate 1, the metal film 3 is formed by sputtering Ag of 20 nm in thickness on the surface where the grooves are formed, and the recording film 4 of an organic pigment film, the dielectric film 5 made from SiN of 10 nm in thickness and the light transmissive protection film 6 are sequentially formed on the metal film 3.

The organic pigment film is formed by spin coating. In this case, thickness of the film is set to 170 nm inside the grooves and 70 nm on the land portions.

Further, in this embodiment, the organic pigment film has the above mentioned L-edge characteristic, where derivative of triphenylamine that is organic pigment material having optical constants (n, k)=(2.0, 0.05) before recording and changed into (n, k)=(1.5, 0) after recording at 405 nm in wavelength is used.

Further, the structure of this film is designed to maintain high reflectance both before recording and after recording so that phase modulation can occur easily. Specifically, within the grooves reflectance before recording is 26% and that after recording is 32%. On the other hand, reflectance in the land portions is 32%.

With respect to the optical recording medium, recording marks M comprising 0.69 μm long marks and 0.69 μm long spaces were repeatedly recorded within the grooves. In this case, as shown schematically in FIG. 2, width of the marks extends substantially over the entire area in the width of the groove.

Figure 6:
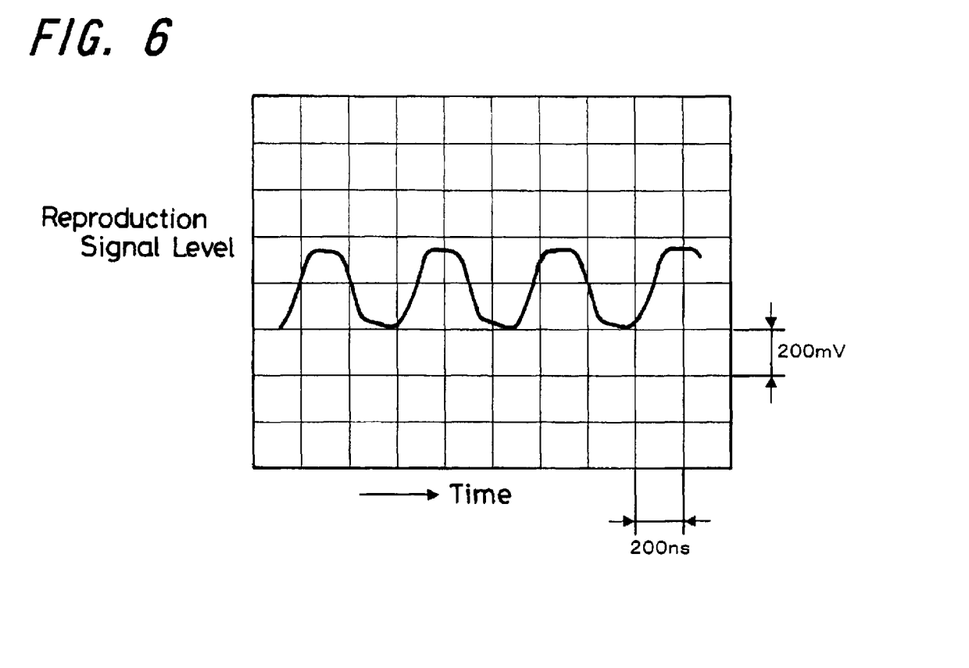
FIG. 6 is a characteristic curve showing a reproduction signal waveform of the optical recording medium according to the present invention.

FIG. 6 shows a reproduction waveform of the recording marks M, i.e., a waveform of the reflected light amount in the optical recording medium according to the first embodiment.

Further considerations were made by setting the first embodiment to the corresponding parameter and performing a computer simulation. In this case, so-called Fraunhofer diffraction theory was used as a calculation method. The calculation results correspond extremely well with experimental results. Also, the calculation parameters were selected to be high resolution in order to cope with delicate fluctuation in the shape of the grooves and the resolution on the disc was set to 10 nm. Thus, the calculation results were made in faithfully consistent with the experimental results.

Furthermore, in specific parameters used in the calculation, spreading angles of a semiconductor laser used as a light source were set to 40° and 20° and a 2x anamorphic prism was disposed at the subsequent stage to a collimator lens to have a function equivalent to spreading angle 40° in all directions. The focal length of the collimator lens was set to 10 nm. The object lens was set to 1.3 mm in radius (radius of aperture) and 0.85 in numerical aperture N.A. The amount of light returning to the aperture of the object lens was obtained by performing Fourier transformation of the distribution on the aperture surface, projecting the result on a standardized disc based on the N.A. of the lens and wavelength, and performing reverse Fourier transformation after multiplying the complex reflectance given in consideration of the shape of the grooves and the film structure in the above mentioned 10 nm resolution by the incident light amount. Thus, the detection signal was calculated on the assumption that the entire light amount returning to the aperture of the object lens returned to a detector for detecting the signal.

Then, amplitude and degree of modulation were examined by monitoring the carrier wave provided by repeating 0.69 μm marks and 0.69 μm spaces.

The marks M provided within the grooves 2 has a so-called stadium shape of 0.12 μm in width as schematically shown in FIG. 2. Similarly to the first embodiment, depth of the grooves was set to 100 nm, width of the grooves was set to 0.12 μm and space between grooves was set to 0.6 μm. Further, width of the slope of the side walls d corresponding to the first embodiment (the projection width d of the side walls 2a shown in FIG. 3 onto the extended horizontal surface of the bottom surface of the groove) was set to 40 nm.

Figure 7:
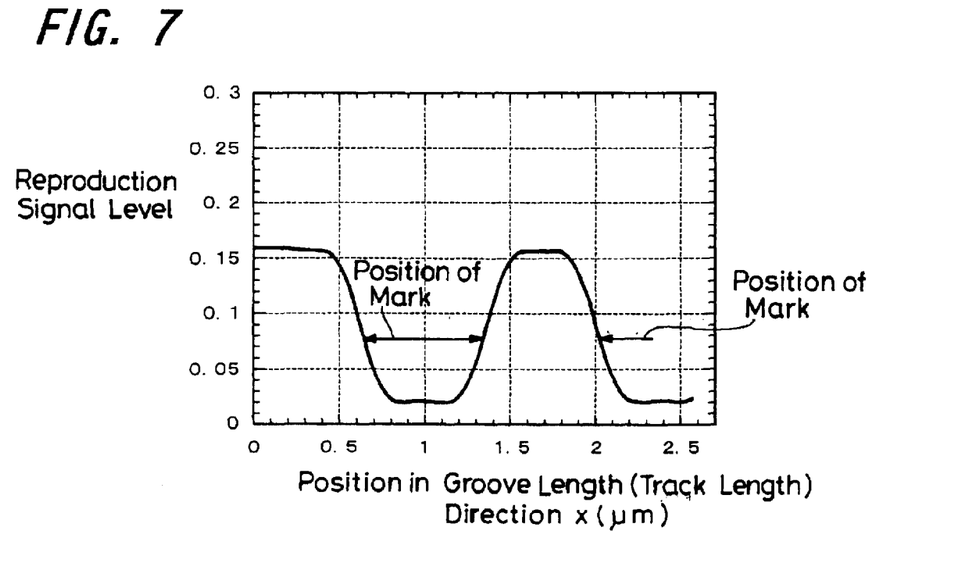
FIG. 7 is a characteristic curve showing a reproduction signal level with respect to the direction of length of grooves.

Calculation results in the selected parameters are shown in FIG. 7. It is understood that the waveform of the first embodiment shown in FIG. 6 corresponds well with that shown in FIG. 7.

[Second Embodiment]

Figure 8:
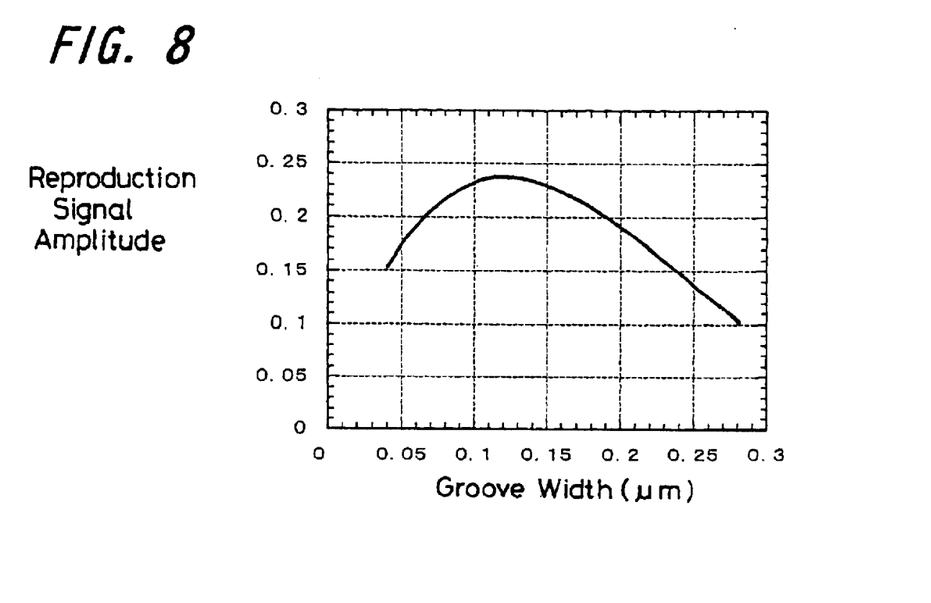
FIG. 8 is a characteristic curve showing groove width dependence of the reproduction signal amplitude.

FIG. 8 shows measurement results of respective reproduction signal amplitude, i.e., the returned light amounts obtained by changing the width of the groove in the optical recording medium according to the first embodiment. As shown in FIG. 8, the signal amplitude declines when the width of grooves exceeds a certain value. The reason for that is when width of the grooves thus increases as compared to that of the marks, the proportion of width of the marks within a spot of the reproduction light increases as the reproduction light spot comes to the center of the mark and the reflectance increases as a result of decreased interference with the land portions.

Figure 9:
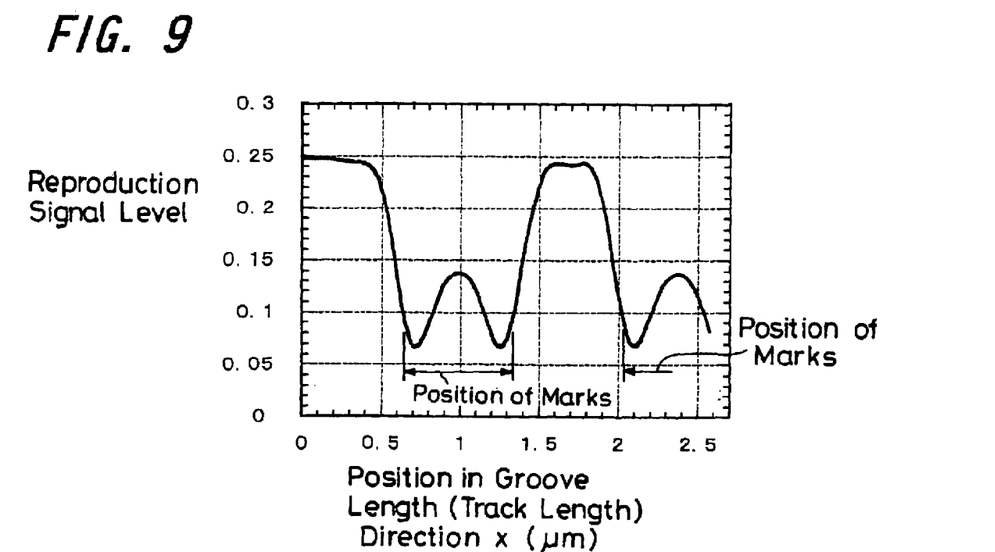
FIG. 9 is a characteristic curve showing a reproduction signal level with respect to the direction of length of grooves when width of grooves is increased.

Specifically, FIG. 9 shows a reproduction signal level in the direction of grooves length when width of the grooves is increased to 0.28 μm. According to FIG. 9, the reflectance increases near the center of the marks.

According to FIG. 8, it is understood that the optimum result is obtained when width of the grooves is in the range of 0.1 μm~0.15 μm. Width of the grooves was measured on the surface of the metal film 3, and in the case where the metal film 3 was formed by sputtering, the metal film 3 of 20 nm in the maximum thickness was also formed on the side surfaces of the grooves of the recessed portions 2 in the substrate of this embodiment. Accordingly, when the metal film 3 having 30 nm in thickness is formed, width of the grooves on the surface of the metal film is 0.15 μm and width at the bottom of the recessed portions 2 in the substrate is 0.2 μm.

However, since the metal film 3 of 30 nm or larger in thickness may not be formed uniformly in the grooves of the recessed portions 2 in the substrate and noise may increase, thickness of the metal film 3 is limited to 30 nm and width of the grooves in the substrate, i.e., width of the recessed portions 2 in the substrate is limited to 0.21 μm.

In other words, when the recessed portions 2 in the substrate have grooves of 0.21 μm in width, excellent results can be obtained by forming the metal film thereon.

On the other hand, if the metal film 3 is formed by directional sputtering, it is possible to form the metal film without being attached to the vertical side surfaces of the grooves, and in this case excellent results can be obtained even if width of the grooves is 0.10 μm.

Accordingly, when the recessed portions 2 in the substrate have the width of 0.10 μm~0.21 μm considering tolerance of the metal film formed thereon, the optical recording medium having high degree of modulation can be obtained and satisfactory results can be achieved with the width of the recessed portions being 0.10 μm~0.15 μm on the surface of the metal film formed thereon.

Next, referring to the third embodiment, description will be made on depth of the grooves of the recessed portions 2 in the substrate. Depth of the grooves does not depend on the N.A. of the object lens.

[Third Embodiment]

In the third embodiment, similarly to the first embodiment a phase modulation type optical disc is manufactured by employing the substrate 1 using polycarbonate (PC) in which grooves are formed as the recessed portions 2 and side walls are substantially vertical, forming the metal film 3 by sputtering Ag of 20 nm in thickness on the surface where the grooves are formed, and sequentially depositing thereon an recording film 4 formed of organic pigment film, the dielectric film 5 formed of SiN of 10 nm in thickness and the light transmissive protection film 6.

With respect to width of the grooves of the recessed portions 2 in the substrate, in order to obtain the above mentioned advantageous effect, width of the recessed portions 2, i.e., width of the grooves was set to 0.14 $\mu$m in this embodiment. Further, width of the lands was set to be equal to the width of the grooves. The object lens was N.A.=0.85.

Further, in this embodiment, there were manufactured optical discs in which depths of the grooves of the recessed portions 2 in the substrate were varied.

The organic pigment film was formed by spin coating to have the thickness which provides a flat surface by filling the inside of the grooves, and to have 120 nm in the average thickness of the organic pigment film at the lands 7 and the grooves 2.

Specifically, in the case where depth of the grooves is, e.g., 40 nm, the film thickness at the groove portions is set to 140 nm while the film thickness at the land portions is set to 100 nm.

Also, in this case the organic pigment film formed of organic pigment material having the S-edge characteristic and the optical constants of (n, k)=(1.2, 0.05) before recording and changed into (n, k)=(1.5, 0) after recording at 405 nm in wavelength was employed. The organic pigment material was composed of cyanine k pigment made from 1-butyl-2-[5-(-1-butyl-3.3-dimethylbenz [e]indoline-2-yliden)-1.3-pentadienyl]-3,3-dimethyl-1H-benz[e]indolium perchlorate.

In the third embodiment, length of the recording marks is set to 0.69 $\mu$m and in this case the recording is also made over the entire width of the grooves.

Figure 10:
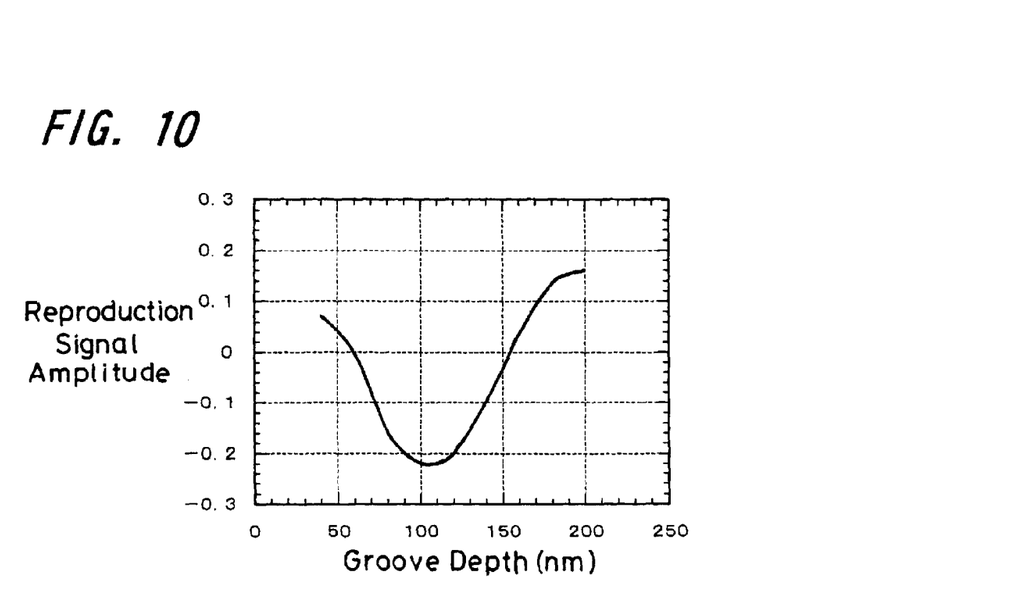
FIG. 10 is a characteristic curve showing groove depth dependence of the reproduction signal amplitude of the optical recording medium.

The change in reproduction signal amplitude with respect to optical discs having different depth of the grooves is shown in FIG. 10. In the case where the S-edge characteristic is employed, the amplitude becomes negative at about 100 nm in depth of the grooves. Specifically, in this case, the light amount detected before recording is low, so that tracking servo signal may not obtained from grooves, thereby causing problems in recording and reproduction.

In a film construction for phase modulation type, even if thickness of the organic pigment film and the SiN film was changed, the amplitude of the reproduction signal became negative at about 100 nm in depth of the grooves but became positive at 50 nm in depth.

Specifically, it is preferable that depth of the grooves in the substrate is at about 50 nm when the organic pigment film having the S-edge characteristic is used. However, according to FIG. 10, the signal amplitude is insufficient if the grooves are 50 nm in depth.

Figure 11:
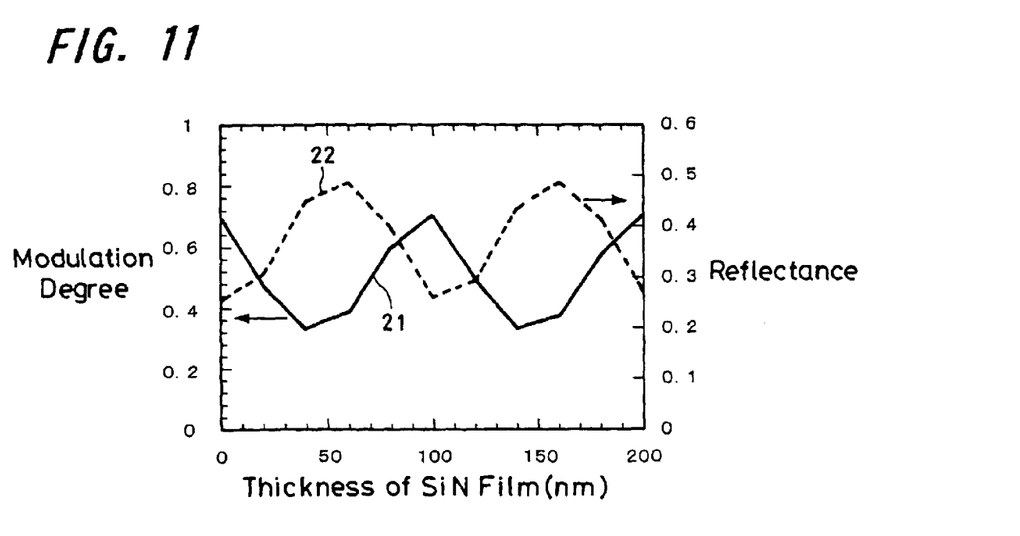
FIG. 11 is a characteristic curve provided to describe the present invention, which shows the relations between SiN film thickness and degree of modulation, and between SiN film thickness and reflectance with respect to the optical recording medium.

Accordingly, depth of the grooves is set to 50 nm and the film construction is selected to enhance the signal amplitude. Specifically, while film thickness of the organic pigment film within the grooves is set to 70 nm, film thickness on the land portions is set to 20 nm, so that the film thickness of the SiN dielectric film 5 is changed and degree of modulation (signal amplitude/output at the space portions between the marks) is measured. The curved line 21 in FIG. 11 shows SiN film thickness dependence of the degree of modulation. On the other hand, the curved broken line 22 in FIG. 11 shows SiN film thickness dependence of reflectance at the space portions and that indicates possibility of optimization. It is to be noted that similar film thickness dependence of the SiN film is observed when thickness of the organic pigment film is changed from 70 nm and the optimum value can be found for each film thickness to obtain sufficient signal amplitude.

Further, since degree of modulation of the actual optical recording medium, for example, the optical disc is desirably 0.6 or higher, satisfactory results can be obtained at about 50 nm in depth of the grooves with the film thickness of the SiN film set to virtually zero or about 100 nm.

Then, considerations were made on tolerance when the depth of grooves in the third embodiment shifts from 50 nm.

Although the film construction was basically similar to that of the third embodiment, thickness of the SiN film was set to 100 nm and thickness of the organic pigment film within the grooves was set to 70 nm.

Then, depth of the grooves in the substrate was changed. In this case, when depth of the grooves was in the range of 20 nm to 50 nm, film thickness on the land portions was set such that the surface of the organic pigment film became flat, and when depth of the grooves was set to 60 nm, film thickness on the land portions was 10 nm, when the depth of the grooves was 70 nm, film thickness on the land portions was 20 nm, and steps were formed on the surface of the organic pigment film.

Figure 12:
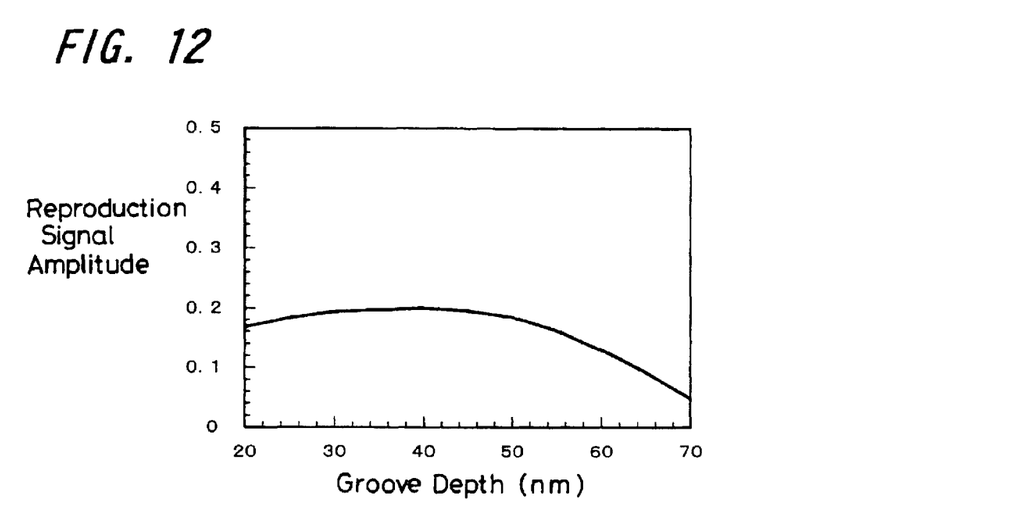
FIG. 12 is a characteristic curve provided to describe the present invention, which shows groove depth dependence of a reproduction signal amplitude.

Groove depth dependence of the reproduction signal amplitude under the above conditions is shown in FIG. 12, indicating the peak value when the grooves are 40 nm in depth and generally flat characteristic and very little groove depth dependence when the grooves have at about 50 nm in depth.

Figure 13:
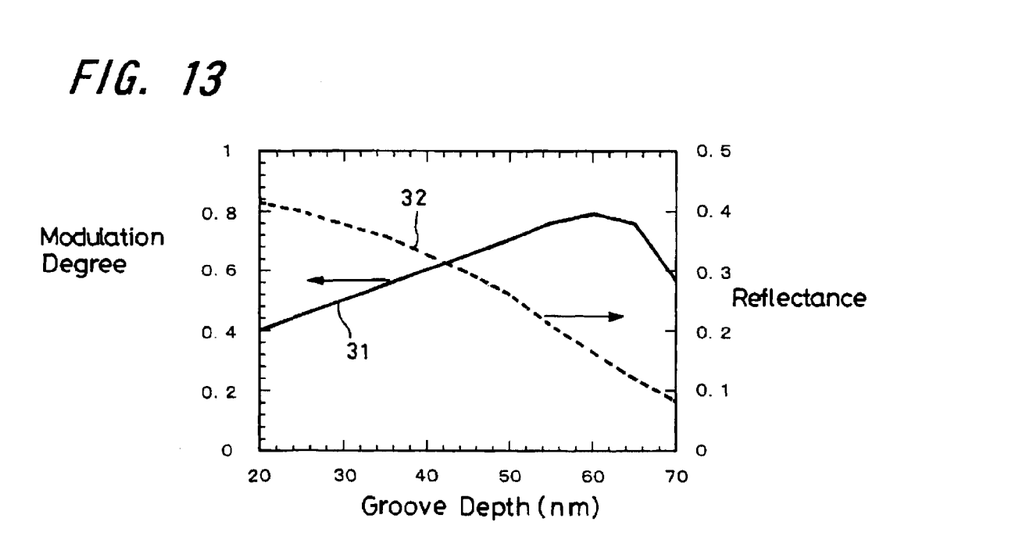
FIG. 13 is a characteristic curve provided to describe the present invention, which shows the relations between groove depth and degree of modulation, and between groove depth and reflectance with respect to the optical recording medium.

Further, groove depth dependence of modulation degree and that of reflectance are each shown by curved lines 31 and 32 in FIG. 13. It is understood that degree of modulation reaches the maximum value at 60 nm and that, on the contrary, reflectance becomes higher as the grooves become shallower. Although the range in which degree of modulation becomes 0.6 or higher is 40 nm~70 nm in depth of the grooves, both amplitude and reflectance decrease at 70 nm, whereby the range of 40 nm~65 nm is determined as the suitable range for the substrate employing the organic pigment film having the S-edge characteristic.

It is to be noted that practically the same results were obtained when the thickness of the SiN film was zero or when thickness of the organic pigment film was changed.

[Fourth Embodiment]

In this embodiment, though the thickness of the organic pigment film, substrate structure and shape of the marks were similar to those of the third embodiment, the organic pigment film was formed of triphenylamine derivative having the L-edge characteristic used in the first embodiment.

Figure 14:
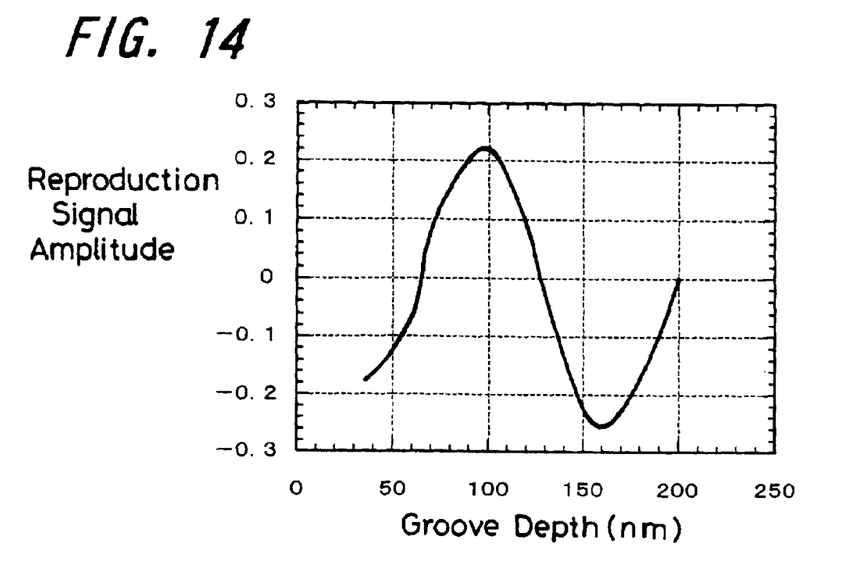
FIG. 14 is a characteristic curve provided to describe the present invention, which shows groove depth dependence of a reproduction signal amplitude.

FIG. 14 shows groove depth dependence of the reproduction signal amplitude in this case.

Contrary to the case in which the organic pigment film having the S-edge characteristic is used, in this case, it is understood that the amplitude becomes negative at 50 nm in depth of the grooves and the largest amplitude can be obtained at 100 nm in depth.

Figure 15:
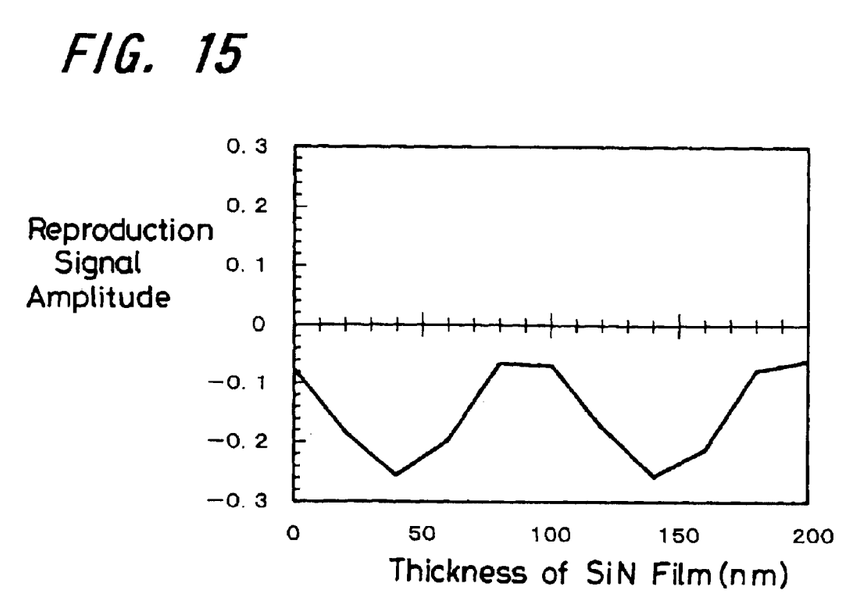
FIG. 15 is a characteristic curve provided to describe the present invention, which shows the dependence of the reproduction signal amplitude on SiN film thickness with respect to the optical recording medium.

Further, even if thickness of the organic pigment film and that of the SiN film were changed, satisfactory results could not be obtained at about 50 nm in depth. FIG. 15 shows SiN film thickness dependence of the reproduction signal amplitude at 50 nm in depth of the grooves, and the amplitude shows negative.

Specifically, the aspect of the L-edge characteristic is different from the S-edge characteristic and it is preferable that the depth of the grooves is at about 100 nm in the organic pigment film having the L-edge characteristic.

Figure 16:
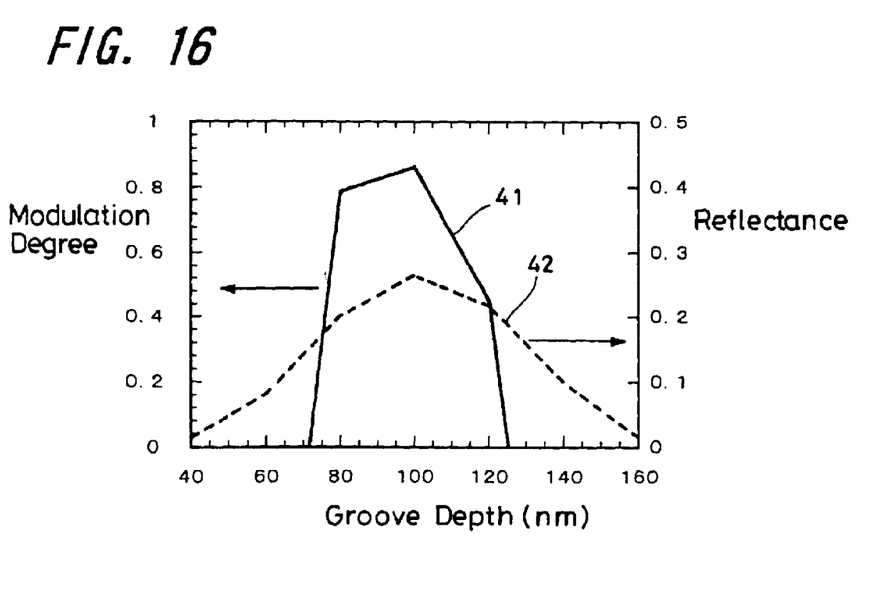
FIG. 16 is a characteristic curve provided to describe the present invention, which shows the relations between groove depth and degree of modulation, and between groove depth and reflectance with respect to the optical recording medium.

The curved line 41 in FIG. 16 shows degree of modulation near 100 nm in depth of the grooves while the curved line 42 shows reflectance thereof.

As shown in the figure, degree of modulation increases as the grooves become deeper and the organic pigment film becomes thicker, but tolerance to the depth of the grooves decreases, thereby satisfactory degree of modulation being obtained in the range of 75 nm~115 nm in depth of the groove. Accordingly, as shown in FIG. 14, the signal amplitude sharply falls into the negative outside this range, and in this case the range of the suitable groove depth is extremely obvious.

Although with respect to the DVR parameters there have been described width and depth of the recessed portions 2, i.e., width and depth of the grooves referring to the embodiments, hereinafter considerations will be made on the recessed portions 2, namely slope of the sidewalls.

Actually, slope of the side walls of the grooves becomes not negligible when the grooves become 100 nm in depth and about 0.15 μm in width.

[Fifth Embodiment]

This embodiment is to study the slope of side walls of the grooves in the substrate, i.e., of the recessed portions 2, and in this embodiment the same film construction as in the first embodiment using the organic pigment film which has the L-edge characteristic is employed.

Then depth of the grooves in the substrate was set to 100 nm in order that effect on the slope of the side walls of the grooves becomes obvious. Width of the grooves was set to 0.14 μm considering the above results, and the slope was changed while maintaining the width at the center portion of the side walls.

Further, thickness of the organic pigment film is set to 170 nm within the grooves and 70 nm on the land portions, thereby making each surface of the organic pigment film on the substrate substantially flat. Furthermore, the thickness of the organic pigment film on the sloped side walls of the grooves is determined to make the above mentioned surface flat.

Figure 17:
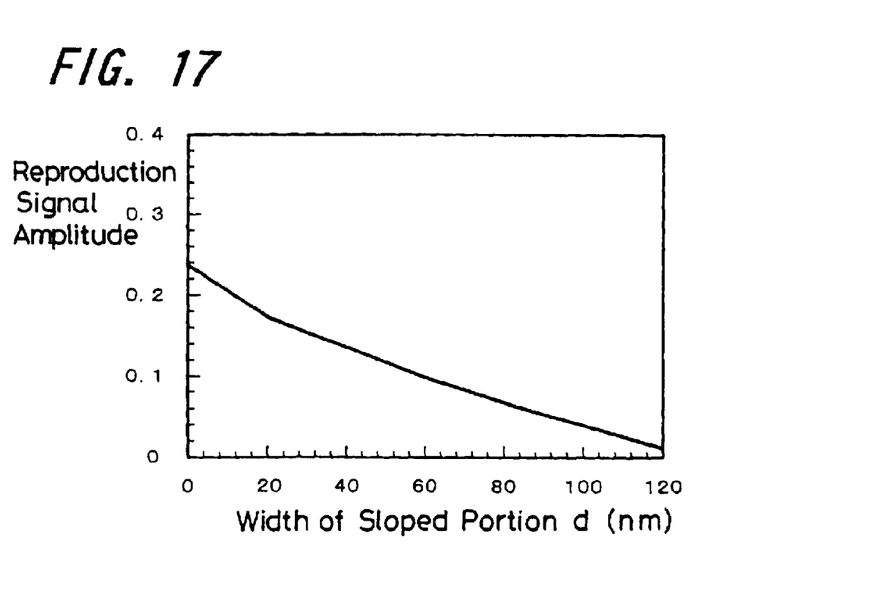
FIG. 17 is a characteristic curve provided to describe the present invention, which shows slope width dependence of a reproduction signal amplitude.

In this construction, FIG. 17 shows dependence of the reproduction signal amplitude after recording on the organic pigment film on slope width d (the above mentioned width of the side walls projected onto the extended horizontal surface of the bottom surface of the respective grooves as shown in FIG. 3). According to FIG. 17, the amplitude simply decreases as the slope width increases.

Figure 18:
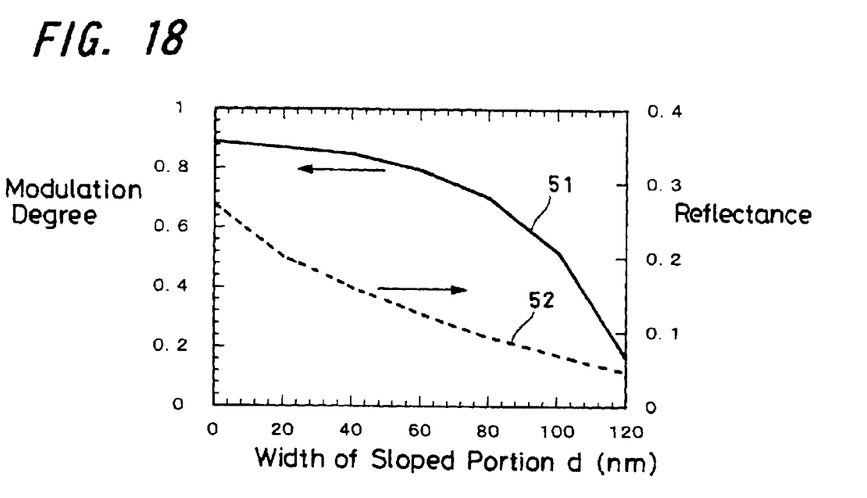
FIG. 18 is a characteristic curve provided to describe the present invention, which shows slope width dependence of degree of modulation, and slope width dependence of reflectance.

Also, in FIG. 18 the curved lines 51 and 52 show dependence of modulation degree and of reflectance on slope width d, respectively. As shown in FIGS. 17 and 18, amplitude and reflectance decrease simultaneously as slope width d increases. Although modulation degree is maintained within a certain range, reflectance practically decreases to 15% or less, which is extremely low, when the d is 50 nm or larger, thereby impractically reflectance being less than 10% at d=100 nm as tan θ=1 obtained and being preferable to set tan θ≧2 from practical point of view.

Figure 19:
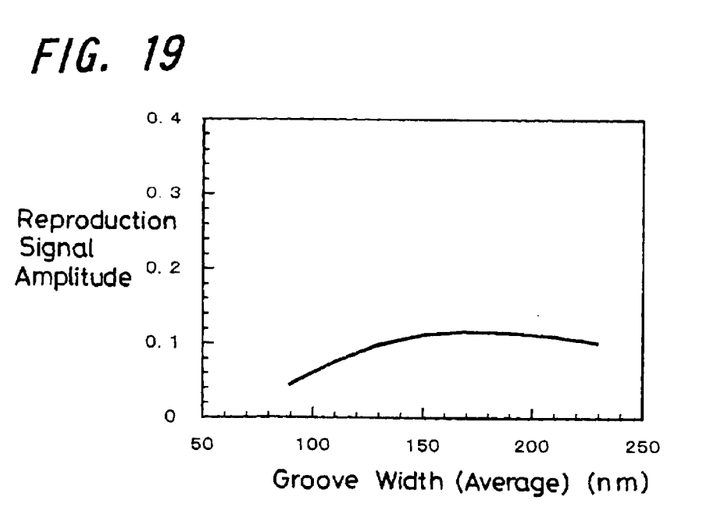
FIG. 19 is a characteristic curve provided to describe the present invention, which shows groove width dependence of a reproduction signal amplitude.

Further, when slope width d shown in FIG. 3 is fixed to d=60 nm in which reflectance is too low and groove width (the average width, i.e., the groove width at the center portion of the side walls) is changed, the amplitude becomes as shown in FIG. 19, wherein the location of d=60 nm in FIG. 17 corresponds to the location of 140 nm in groove width in FIG. 19. According to this, if there is slope at the side walls in the grooves, slight increase in amplitude is obtained by slightly widening the groove width. However, such increase is as low as about 10%~20% which is far from significant improvement.

Figure 20:
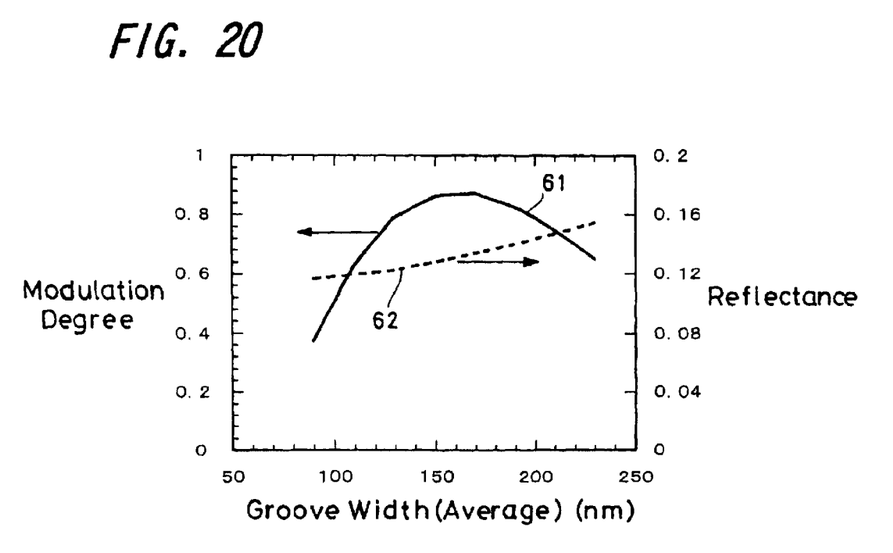
FIG. 20 is a characteristic curve provided to describe the present invention, which shows relations between groove width and degree of modulation, and between groove width and reflectance with respect to the optical recording medium.

Further, the curved lines 61 and 62 in FIG. 20 show dependence of modulation degree and of reflectance on the groove width, respectively, in which reflectance increases only gradually. Accordingly, when there is slope in the side walls, it becomes clear that the signal level basically deteriorates by the amount of reflected light simply being reduced.

Also, as shown in FIG. 19, amplitude has already decreased at 200 nm in width of the groove, and validity of specifying the groove width according to the present invention as described in FIG. 8 proved even if slopes exist in the side walls.

With respect to specifying depth of the recessed portions 2 according to the above mentioned present invention, the above described validity also proved, and satisfactory signal characteristic can be obtained by setting the slope of the side walls expressed as tan θ≧2 without directly concerning the width and depth of the recessed portions 2.

Further, although in the fifth embodiment the organic pigment film having the L-edge characteristic is employed, it is similar to the case where organic pigment film having the S-edge characteristic is used.

Although in the above mentioned embodiments according to the present invention the recording film was composed of the organic pigment film having a single-layer recording film, it can be a multi-layer construction. Further, although in the above mentioned embodiments fine concavity and convexity and recording films are formed on one main surface of the substrate 1, needless to say that various modifications may be made on the present invention such as jointing two substrates 1 each having fine concavity and convexity and recording films on both surfaces or one main surface thereof.

As described above, the write once type optical recording medium according to the present invention is the optical recording medium of a phase modulation type in the DVR parameters, and is capable of providing a satisfactory reproduction signal output by specifying the groove width when reproduction, or reproduction and recording is performed by a laser in the range of 380 nm~450 nm in light source wavelength λ which is a so-called blue-violet region.

Further, in the present invention, depth of the recessed portions is set to about 50 nm or about 100 nm when a blue-violet laser is applied regardless of N.A. of a lens, and the organic pigment film has the optical constant such as the S-edge characteristic of 1.4 or lower refractive index before recording or the L-edge characteristic of 1.6 or higher refractive index before recording, whereby satisfactory reproduction output characteristics can be obtained.

Further, since sufficient light amount can be obtained from portions before recording, i.e., portions to be recorded by performing a so-called High to Low recording in which the returned light before recording is higher than that after recording, a focus servo signal and a tracking servo signal can reliably be obtained, thereby write once recording or reproduction of the optical recording medium being performed reliably and satisfactorily.

As mentioned above, according to the present invention, in an optical recording medium on which blue-violet light is irradiated from the light transmissive protection film side, a write once type optical recording medium comprising recording film formed of organic pigment material and having satisfactory reproduction output characteristics is reliably constructed by specifying width, depth and slope of side walls of the recessed portions constituting fine concavity and convexity on the substrate.

Consequently, the recording film is formed of organic pigment material, whereby the write once type optical recording medium can be manufactured in large quantity at a low cost and industrially significant advantages can be achieved.

DESCRIPTION OF REFERENCE NUMERALS 1 substrate
2 recessed portions
2a sidewall
3 metal film
4 recording film
5 dielectric layer
6 light transmission protective film
7 land portions
9 laser light
10 optical recording medium
11 object lens
M recording marks

What is claimed is:

1. A phase modulation type optical recording medium in which reproduction of recorded portions is performed by irradiating light in the range of 380 nm~450 nm in wavelength λ, characterized in that:

at least one layer or recording film and at least one layer of metal film are formed on a substrate having recessed portions formed therein;

one or more layers of said recording film include organic material that decomposes upon absorption of laser light to change its refractive index; and depth of the recessed portions on said substrate is set to not less than 40 nm nor more than 65 nm and refractive index of the organic material which is used as said recording film and changes said refractive index is set to 1.4 or lower before recording.

2. A phase modulation type optical recording medium in which reproduction of recorded portions is performed by employing irradiation light in the range of 380 nm~450 nm in wavelength λ, characterized in that:

at least one layer of recording film and at least one layer of metal film are formed on a substrate having recessed portions formed therein;

one or more layers of said recording film include organic material that decomposes upon absorption of laser light to change its refractive index; and depth of the recessed portions in said substrate is set to not less than 75 nm nor more than 115 nm and refractive index of the organic material which is used as said recording film and changes said refractive index is set to 1.6 or higher before recording.

3. An optical recording medium according to claim 1, or 2, wherein slope tan θ of side walls of the recessed portions in said substrate is set to 2 or larger (where, θ is the angle defined by said side walls and the bottom surface of said recessed portions).

* * * * *